United States Patent
Lugo-Castillo et al.

(10) Patent No.: US 11,724,678 B2
(45) Date of Patent: Aug. 15, 2023

(54) METHOD AND SYSTEM FOR PERFORMING REGENERATIVE BRAKING WITH FEEDBACK FROM BRAKE-TRACTION CONTROL SYSTEM

(71) Applicant: CUMMINS INC., Columbus, IN (US)

(72) Inventors: Jaime Antonio Lugo-Castillo, Unionville, IN (US); Martin T. Books, Columbus, IN (US); Richard A. Booth, Columbus, IN (US)

(73) Assignee: Cummins Inc., Columbus, IN (US)

( * ) Notice: Subject to any disclaimer, the term of this patent is extended or adjusted under 35 U.S.C. 154(b) by 263 days.

(21) Appl. No.: 17/085,845

(22) Filed: Oct. 30, 2020

(65) Prior Publication Data

US 2022/0135009 A1    May 5, 2022

(51) Int. Cl.
*B60T 8/1763* (2006.01)
*B60W 10/06* (2006.01)
(Continued)

(52) U.S. Cl.
CPC ......... *B60T 8/17636* (2013.01); *B60W 10/06* (2013.01); *B60W 10/08* (2013.01); *B60W 10/18* (2013.01); *B60W 20/10* (2013.01); *B60W 30/02* (2013.01); *B60T 2210/30* (2013.01); *B60T 2210/36* (2013.01); *B60T 2250/04* (2013.01);
(Continued)

(58) Field of Classification Search
CPC ...... B60W 20/15; B60W 10/06; B60W 10/08; B60W 10/184; B60W 10/196; B60W 2540/10; B60W 10/18; B60W 30/18172; B60W 2710/083; B60W 30/18127; B60K 6/24; B60K 6/26; B60K 6/28; B60K 6/36; B60L 7/18; B60L 2250/28; B60L 2240/423; B60L 2240/08; B60L 2240/00; B60L 2250/26; B60L 2260/26; B60L 15/2009; B60L 15/2072; B60L 3/108; F01L 13/06; F02D 13/0249; Y02T 10/64; Y02T 10/72
See application file for complete search history.

(56) References Cited

U.S. PATENT DOCUMENTS

| | | | |
|---|---|---|---|
| 5,025,882 A | * | 6/1991 | Ghoneim ................ B60T 8/175 180/197 |
| 6,275,763 B1 | | 8/2001 | Lotito |

(Continued)

FOREIGN PATENT DOCUMENTS

| | | |
|---|---|---|
| EP | 1190889 A2 | 3/2002 |
| EP | 0794080 B1 | 9/2002 |
| WO | 2019/074581 A1 | 4/2019 |

*Primary Examiner* — Marthe Y Marc-Coleman
(74) *Attorney, Agent, or Firm* — Faegre Drinker Biddle & Reath LLP

(57) ABSTRACT

Methods and systems for operating a vehicle on a reduced traction surface are disclosed. A controller of the vehicle obtains at least one of: ambient information or GPS information, determines a derate increment size based on the ambient or GPS information, imposes a sustained derate by applying a torque limit on a braking torque of the vehicle based on the derate increment size in response to detecting a traction control event. The controller also determines a verification period and a derate reduction period based on the ambient or GPS information to reduce the sustained derate in response to detecting a lack of traction control event during the verification period at a rate determined by the derate reduction period.

20 Claims, 11 Drawing Sheets

(51) Int. Cl.
*B60W 10/08* (2006.01)
*B60W 10/18* (2012.01)
*B60W 20/10* (2016.01)
*B60W 30/02* (2012.01)

(52) U.S. Cl.
CPC ..... *B60T 2270/10* (2013.01); *B60T 2270/602* (2013.01); *B60T 2270/604* (2013.01); *B60W 2555/20* (2020.02)

(56) References Cited

U.S. PATENT DOCUMENTS

| | | | |
|---|---|---|---|
| 6,488,344 B2* | 12/2002 | Huls | B60L 3/108 |
| | | | 303/113.5 |
| 7,266,437 B2 | 9/2007 | Hrovat et al. | |
| 7,853,389 B2 | 12/2010 | Luehrsen et al. | |
| 9,296,301 B2 | 3/2016 | Li | |
| 2002/0055810 A1* | 5/2002 | Nakasako | B60L 3/0046 |
| | | | 903/917 |
| 2015/0298553 A1 | 10/2015 | Maiterth et al. | |
| 2020/0207329 A1 | 7/2020 | Books | |

* cited by examiner

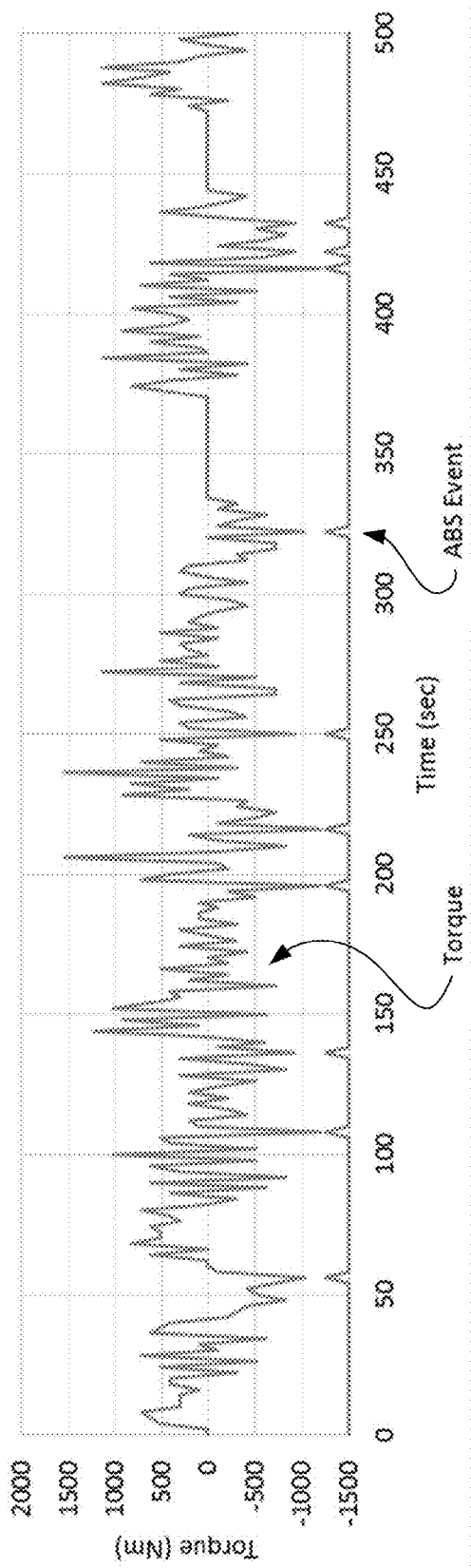
FIG. 3A  Drive Cycle on Reduced Traction Surface
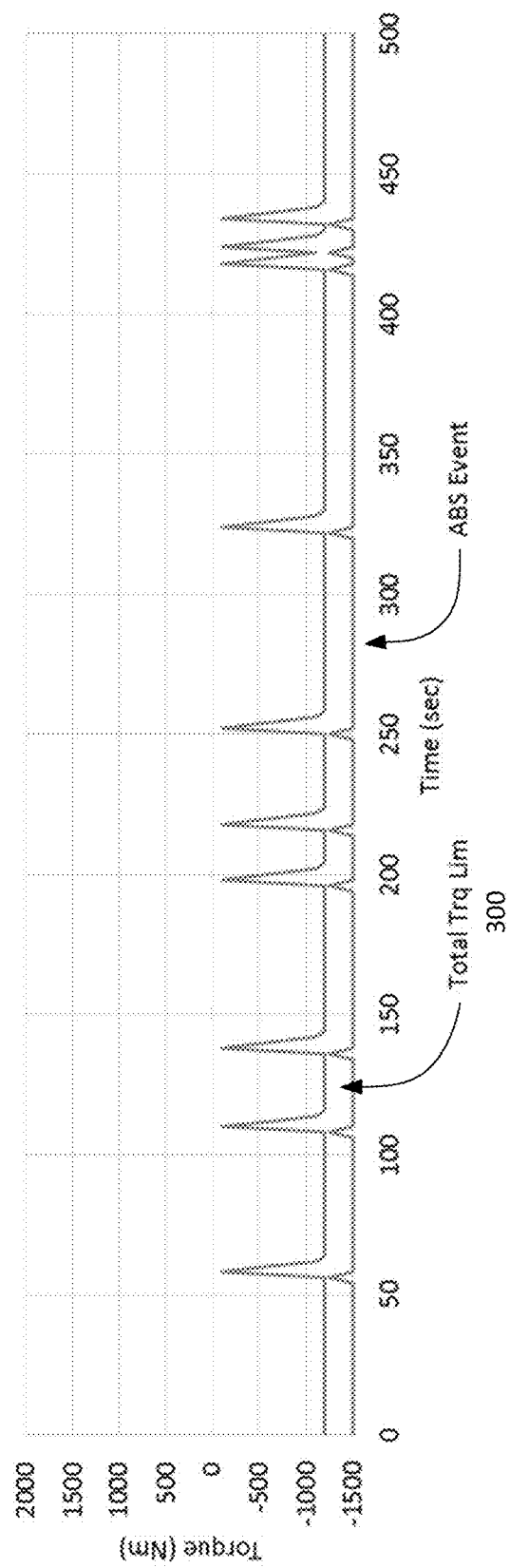
FIG. 3B  Drive Cycle on Reduced Traction Surface

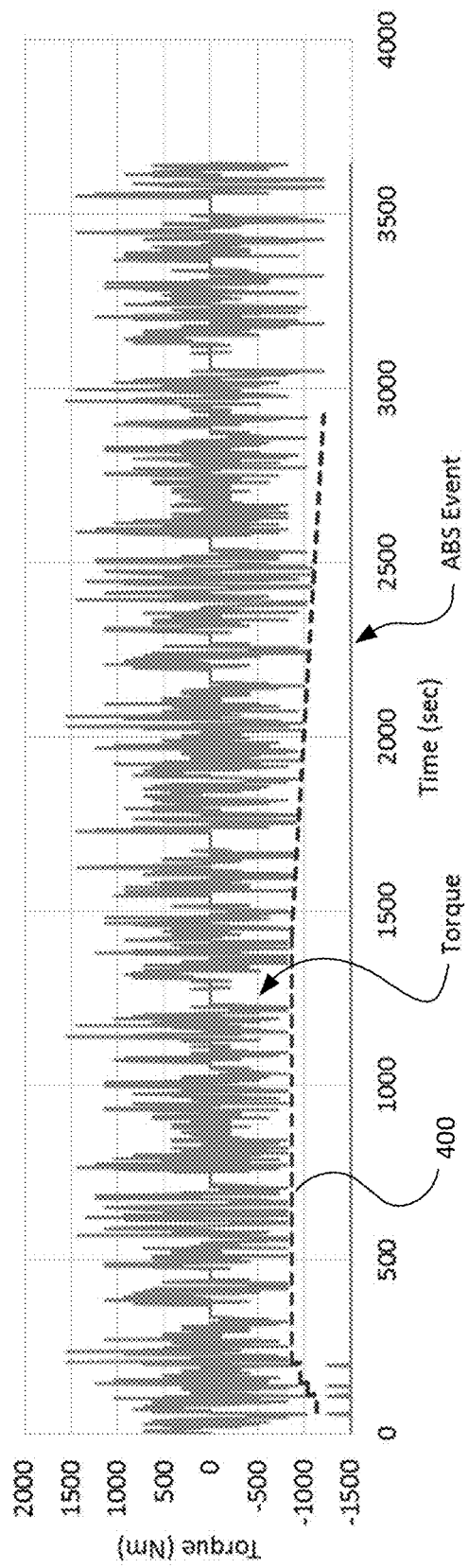
FIG. 4A  Drive Cycle on Reduced Traction Surface
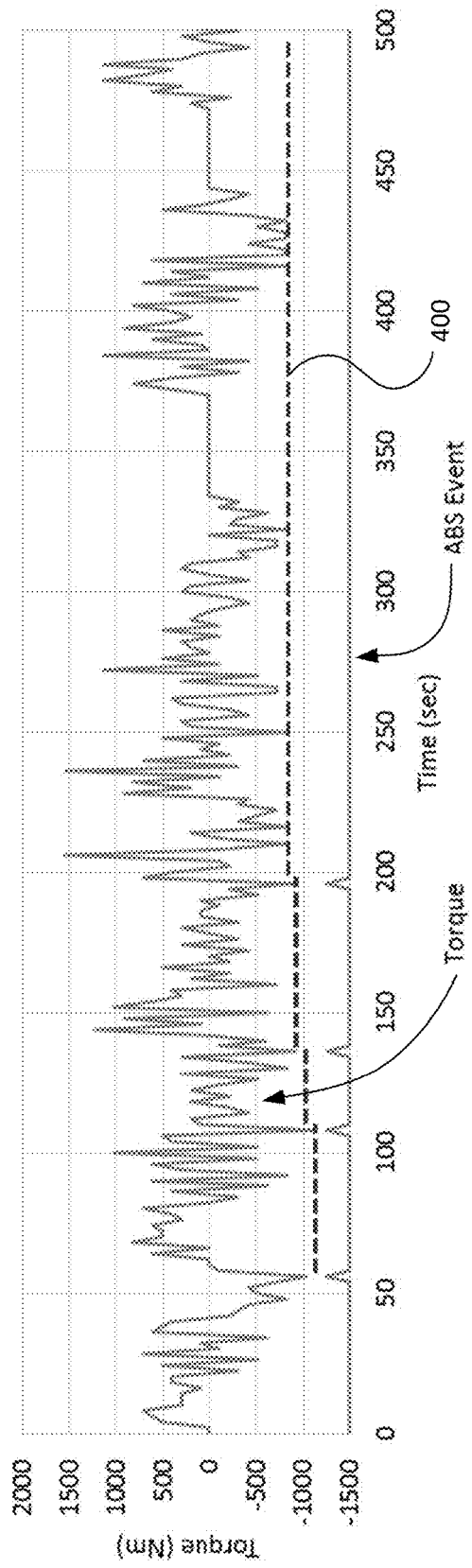
FIG. 4B  Drive Cycle on Reduced Traction Surface

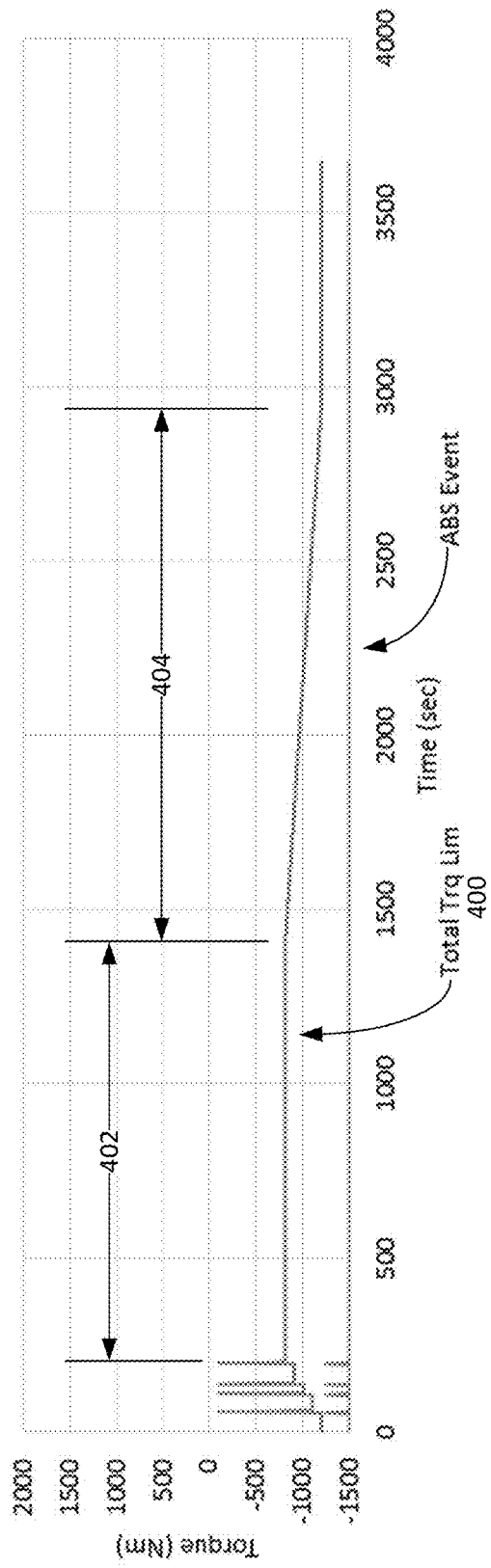
FIG. 4C  Drive Cycle on Reduced Traction Surface
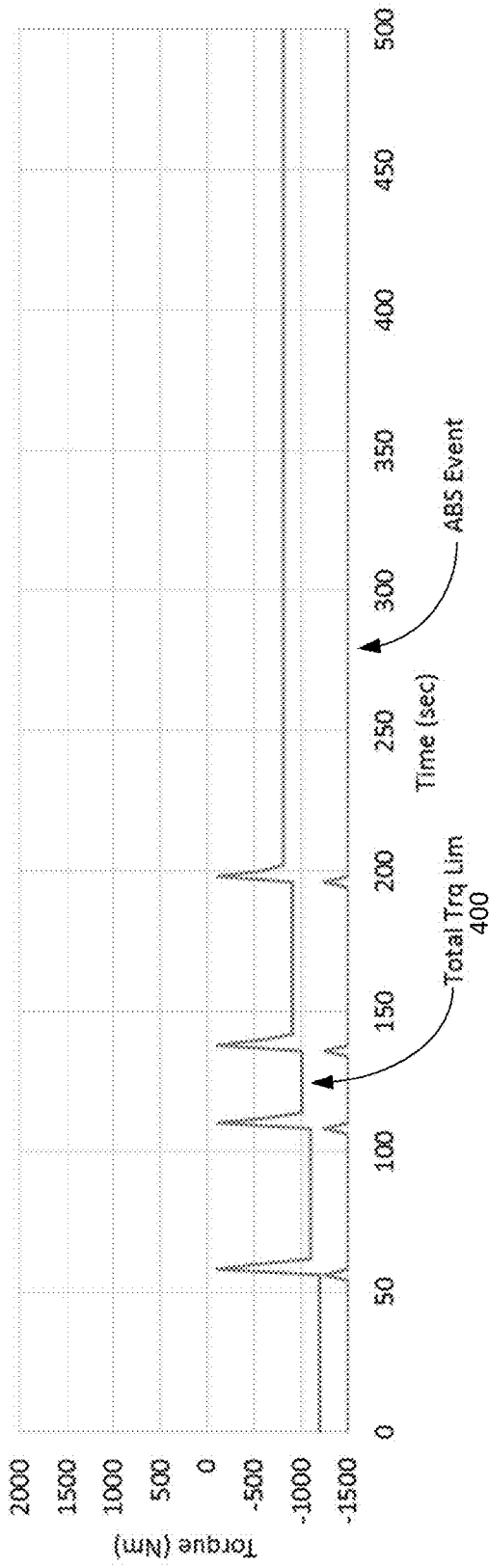
FIG. 4D  Drive Cycle on Reduced Traction Surface

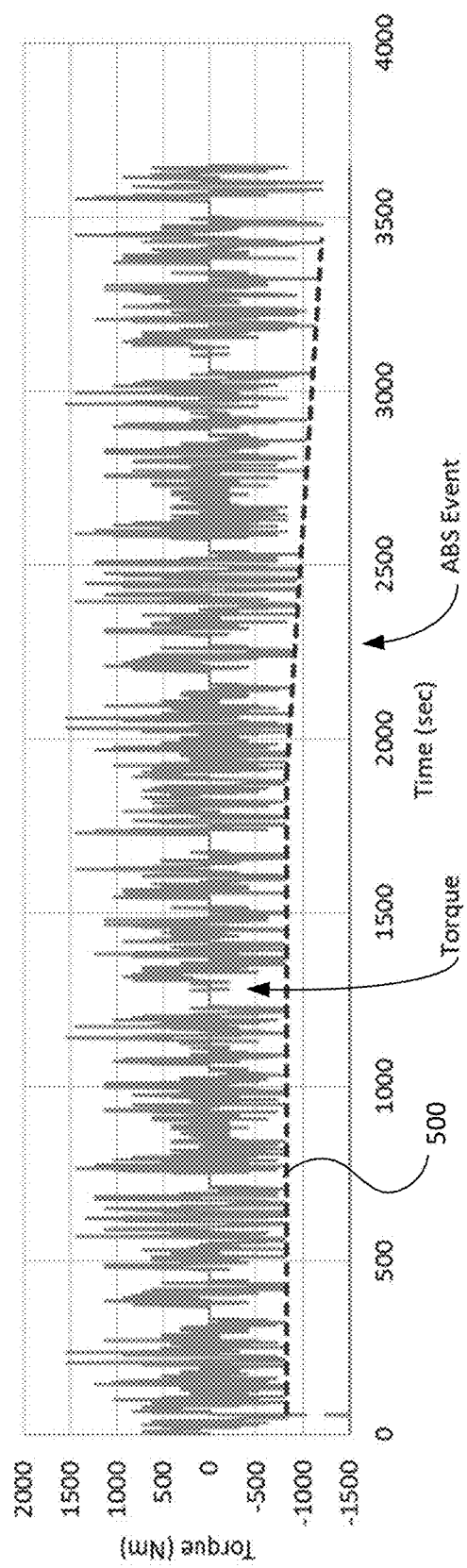
FIG. 5A  Drive Cycle on Reduced Traction Surface
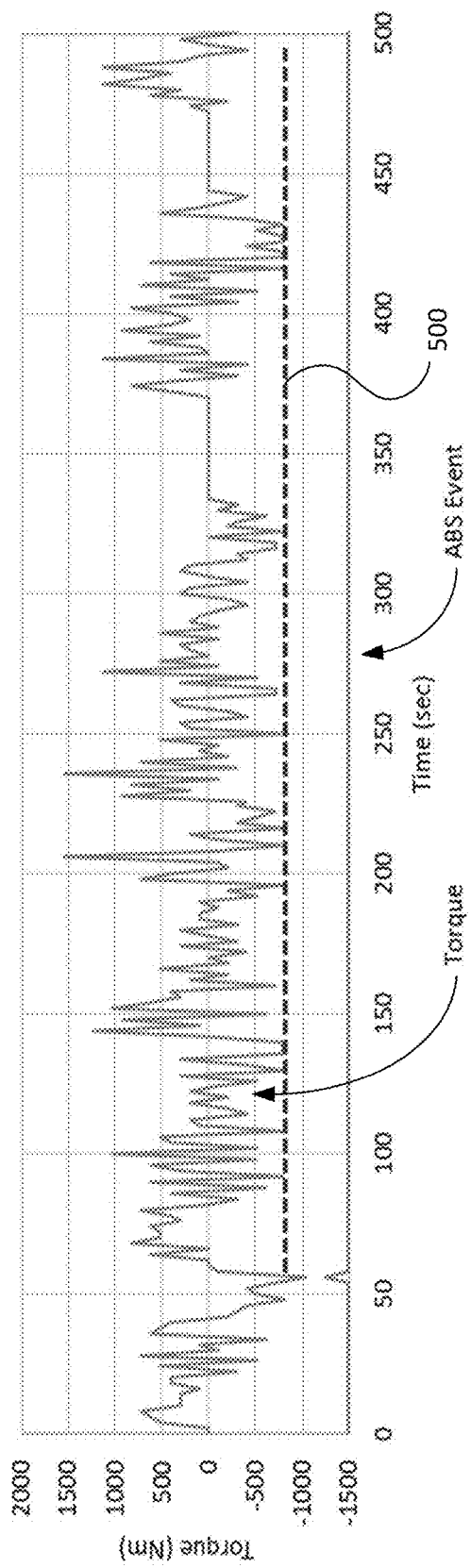
FIG. 5B  Drive Cycle on Reduced Traction Surface

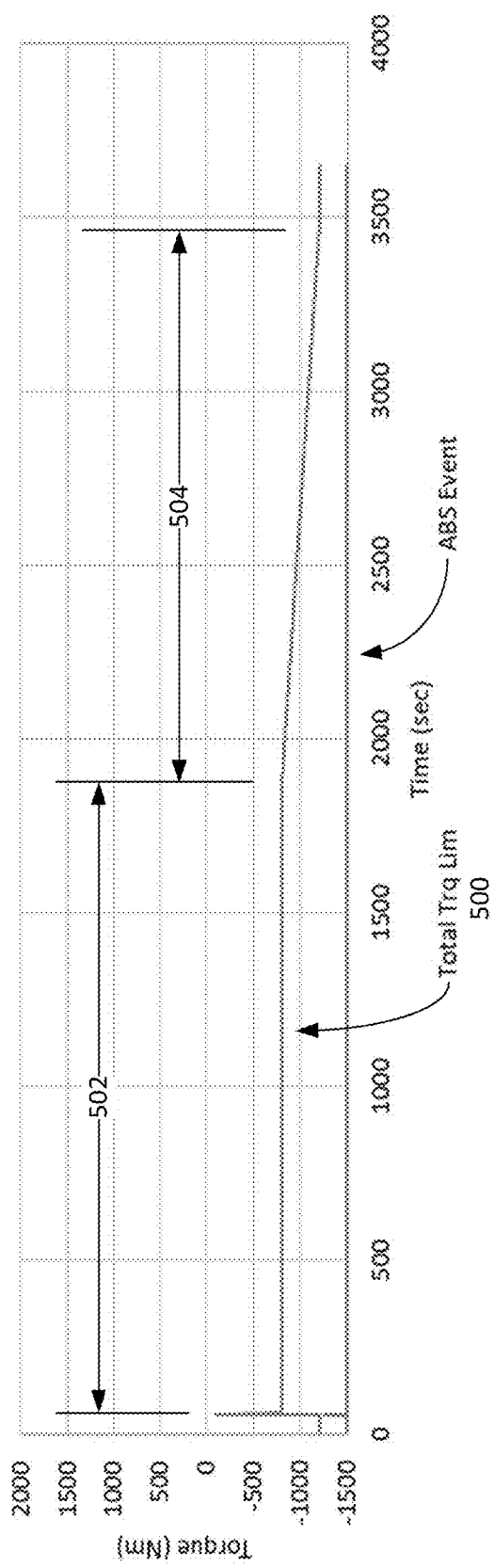
FIG. 5C    Drive Cycle on Reduced Traction Surface
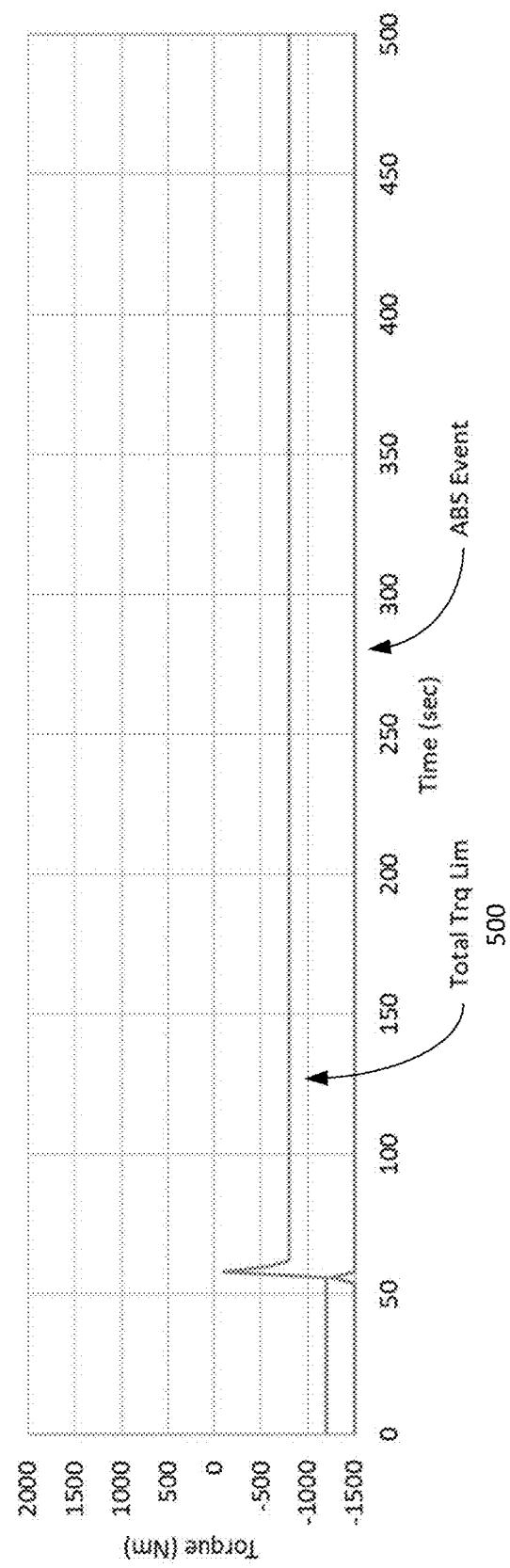
FIG. 5D    Drive Cycle on Reduced Traction Surface

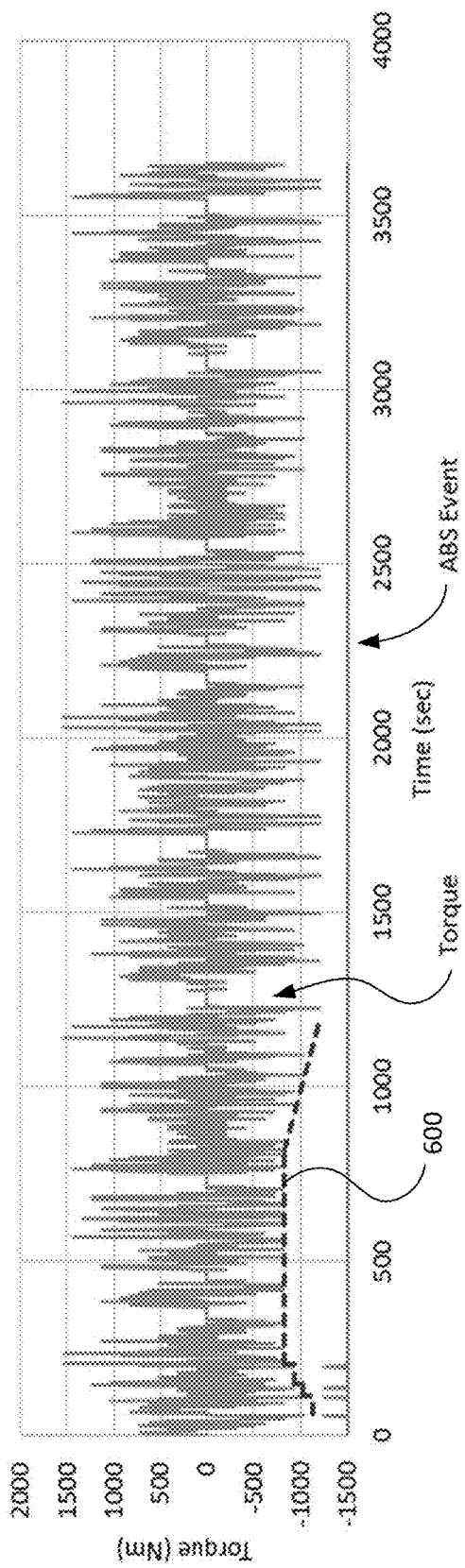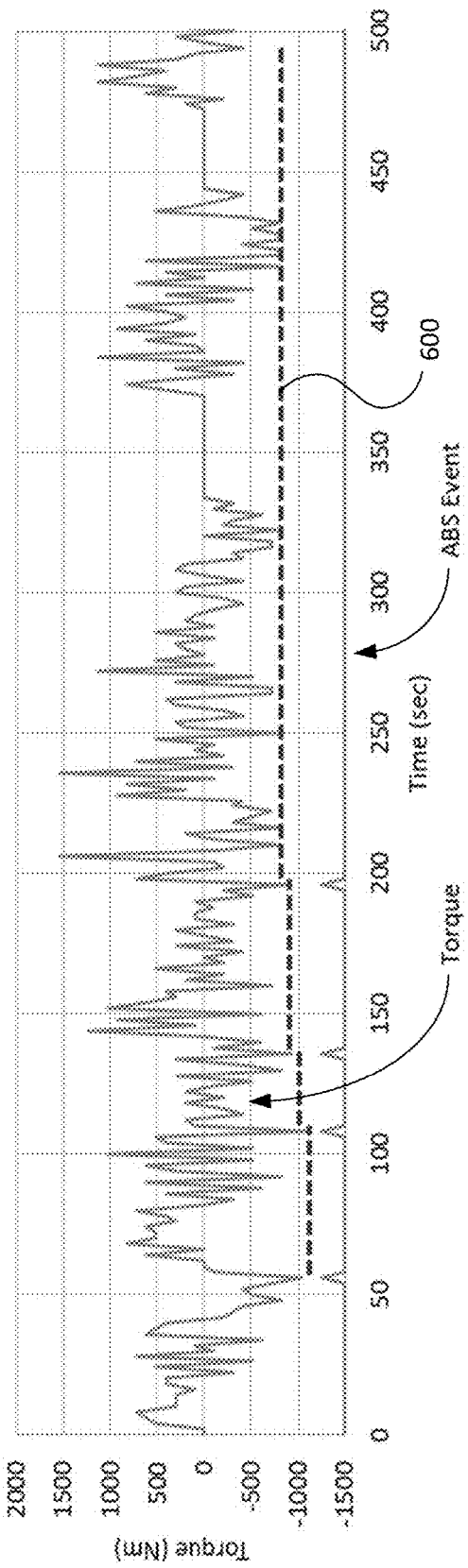
FIG. 6A  Drive Cycle on Reduced Traction Surface
FIG. 6B  Drive Cycle on Reduced Traction Surface

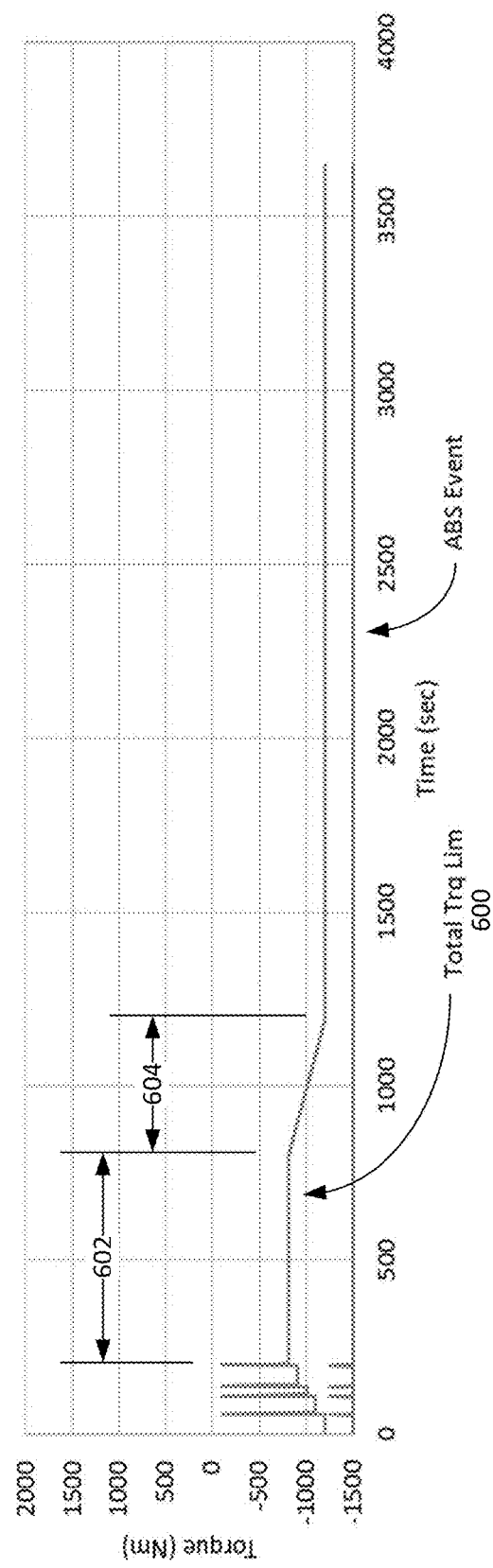
FIG. 6C Drive Cycle on Reduced Traction Surface
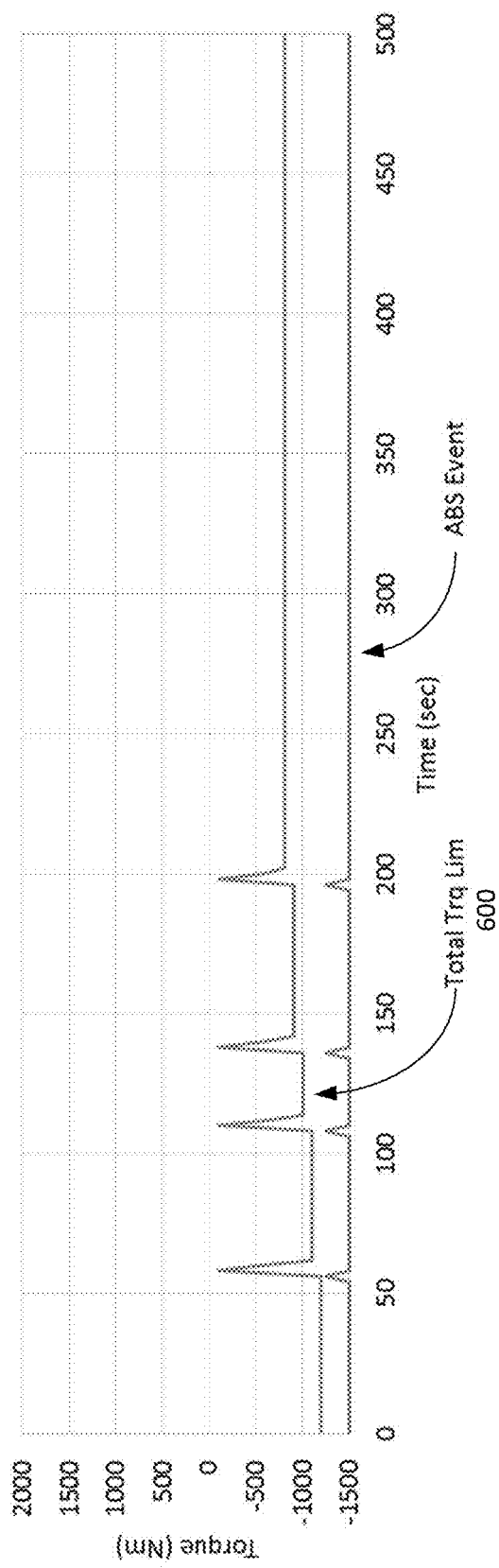
FIG. 6D Drive Cycle on Reduced Traction Surface

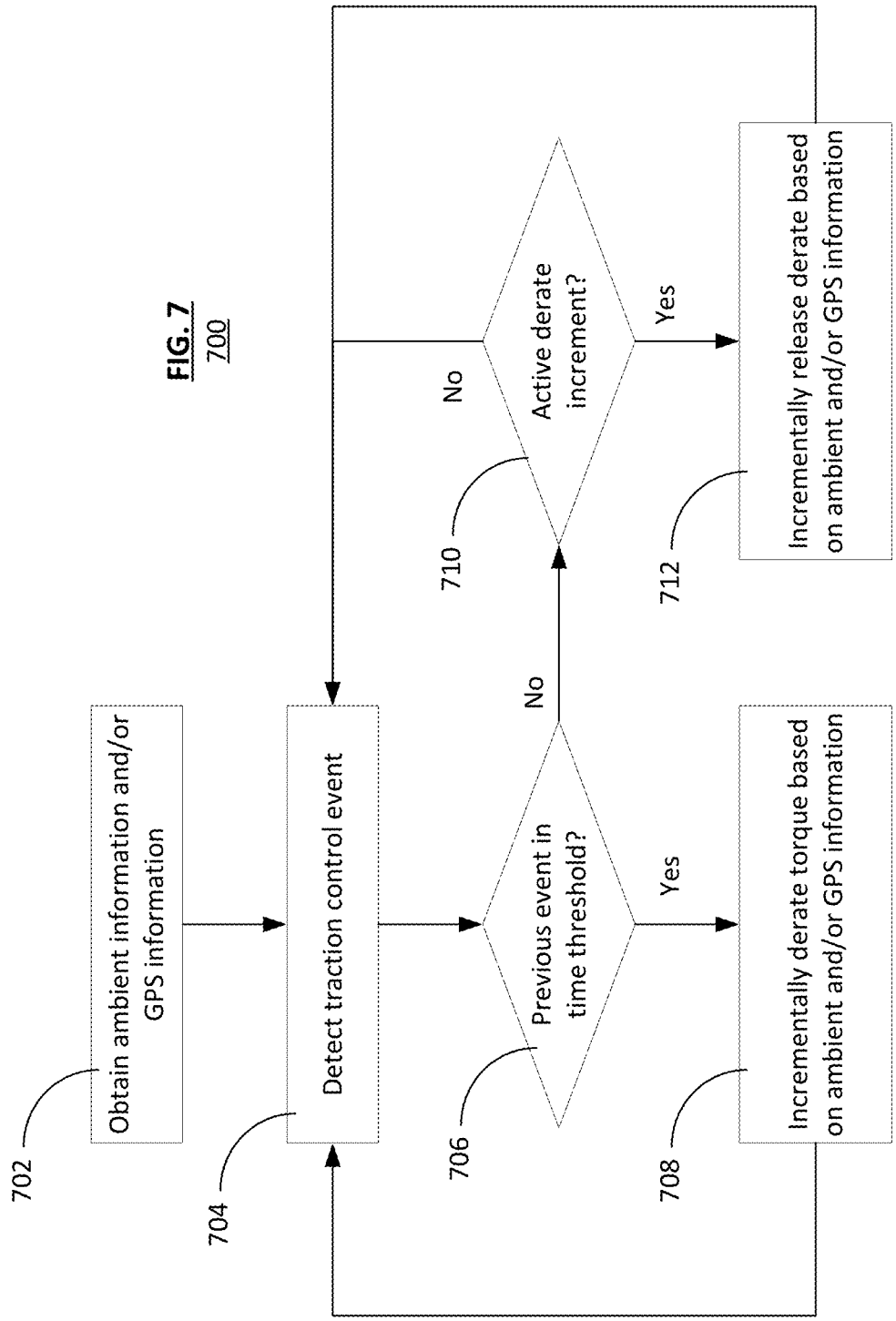

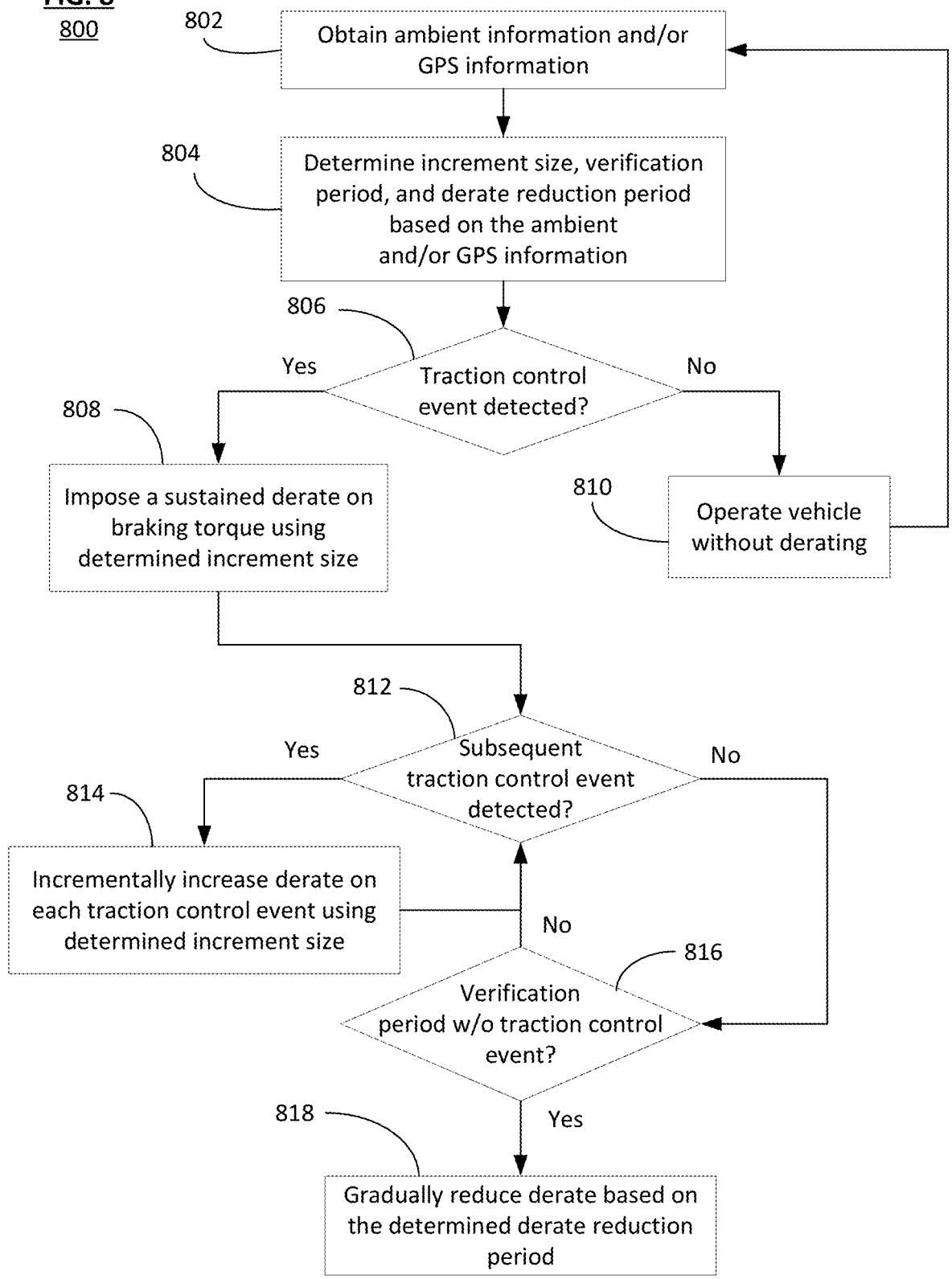

METHOD AND SYSTEM FOR PERFORMING REGENERATIVE BRAKING WITH FEEDBACK FROM BRAKE-TRACTION CONTROL SYSTEM

FIELD OF THE DISCLOSURE

The present disclosure relates generally to hybrid vehicles, especially to improving braking and traction control of the hybrid vehicles.

BACKGROUND OF THE DISCLOSURE

Environmental concerns and limited natural resources are highlighting the desire for reduced fuel consumption. One promising avenue toward the reduction of fuel consumption is the use of hybrid and electric powertrains. Such powertrains utilize regenerative braking to increase the overall efficiency of the system. Regenerative braking provides negative torque to the driveline and recovers kinetic energy from a moving vehicle, which is stored as electrical potential energy. Vehicles may also include other types of braking systems that create negative torque, such as compression release braking and exhaust braking, and of course accelerator pedals to create positive torque.

Most vehicles today are provided with a traction control system, such as an anti-lock brake system (ABS). The traction control system detects loss of traction between the wheels and the road surface such as may occur during a torque change. The traction control system intervenes in response to a traction control event during a torque change by sending a command to the engine/motor controller or retarder controller to derate traction and/or retard torque on the driveline during the traction control event. When the traction control event is over, the derate is removed at a controlled rate to avoid problems with a sudden reapplication of torque. There is no lasting effect of one of these temporary derates, beyond the duration of the event itself.

In presently available hybrid and electric powertrain systems, regenerative and other braking is typically triggered by means other than actuation of the brake pedal, such as at the low end of the accelerator pedal when it is lifted or released. As a result, by lifting of the accelerator pedal a significant amount of braking is automatically applied, which may create a traction control event in slick conditions. Since the amount of negative torque that is applied is predetermined and typically based on dry road conditions and other factors, and with a significant amount of regenerate braking being automatically applied whenever the driver releases the accelerator pedal, poor traction road conditions are likely to produce multiple traction control events. This is because the same amount of retarder torque is re-applied to the powertrain each time the accelerator pedal is released, regardless of any history of traction loss. It would be desirable for the braking control system to mitigate the likelihood of future traction loss by taking action to reduce regenerative braking limits automatically. Simply offering a dashboard switch to turn off or reduce regenerative braking could result in energy capture being disabled long-term, even with favorable road conditions. Therefore, further technological developments are desirable in this area.

SUMMARY OF THE DISCLOSURE

Various embodiments of the present disclosure relate to methods and systems to detect a loss of traction via digital information conveyed by an onboard ABS device. A method of operating a vehicle on a reduced traction surface includes the controller of the vehicle obtaining at least one of ambient information or GPS information, determining a derate increment size based on the ambient information or the GPS information, and, in response to detecting a traction control event, imposing a sustained derate by applying a torque limit on a braking torque of the vehicle based on the derate increment size.

In some examples, the method includes the controller incrementally increasing the sustained derate on the braking torque based on the derate increment size in response to detecting subsequent traction control event. In some examples, the method includes the controller determining a verification period based on the ambient information or the GPS information and in response to detecting a lack of traction control event during the verification period, determining to remove the torque limit.

In some examples, the method includes the controller determining a derate reduction period based on the ambient information or the GPS information and reducing the sustained derate at a rate determined by the derate reduction period in response to determining to removing the torque limit. In some examples, the derate increment size, the verification period, and the derate reduction period are greater when the ambient information or the GPS information indicates a lower atmospheric temperature. In some examples, the lower atmospheric temperature is at or below 0° C.

In some examples, the ambient information used in the method includes one or more of: atmospheric temperature, atmospheric pressure, weather condition, humidity, or precipitation. In some examples, detecting the traction control event includes interpreting a signal from a traction control system of the vehicle indicative of a loss of traction. In some examples, the traction control system is an anti-lock brake system of the vehicle.

In some examples, imposing the sustained derate further includes one of: derating a negative braking torque or derating a positive drive torque. In some examples, imposing the sustained derate further includes limiting the negative braking torque applied by regenerative braking. In some examples, imposing the sustained derate further includes limiting the negative braking torque applied by compression release braking. In some examples, imposing the sustained derate further includes limiting the negative braking torque applied by exhaust braking.

Further disclosed herein are apparatuses for operating a vehicle on a reduced traction surface. The apparatus includes a controller which obtains at least one of ambient information or GPS information, determines a derate increment size based on the ambient information or the GPS information, and imposes a sustained derate by applying a torque limit on a braking torque of the vehicle based on the derate increment size in response to detecting a traction control event.

In some examples, the controller also incrementally increases the sustained derate on the braking torque based on the derate increment size in response to detecting subsequent traction control event. In some examples, the controller further determines a verification period based on the ambient information or the GPS information and determines to remove the torque limit in response to detecting a lack of traction control event during the verification period.

In some examples, the controller also determines a derate reduction period based on the ambient information or the GPS information and reduces the sustained derate based on the derate reduction period in response to detecting a lack of traction control event during the derate reduction period. In some examples, the derate increment size, the verification period, and the derate reduction period are greater when the ambient information or the GPS information indicates a lower atmospheric temperature. In some examples, the lower atmospheric temperature is at or below 0° C.

In some examples, the ambient information used by the apparatus includes one or more of: atmospheric temperature, atmospheric pressure, weather condition, humidity, or precipitation. In some examples, the controller detects the traction control event by interpreting a signal from a traction control system of the vehicle indicative of a loss of traction. In some examples, the controller imposes the sustained derate by derating a negative braking torque or derating a positive drive torque.

Also disclosed herein are vehicle systems including a drive unit with a prime mover and a controller coupled with the drive unit. The controller can obtain at least one of: ambient information or GPS information, determine a derate increment size, a verification period, and a derate reduction period based on the ambient information or the GPS information, impose a sustained derate to the drive unit in response to detecting a traction control event by applying a torque limit on a braking torque of the drive unit based on the derate increment size, determine to remove the torque limit in response to detecting a lack of traction control event during the verification period, and reduce the sustained derate based on the derate reduction period in response to detecting a lack of traction control event during the derate reduction period.

While multiple embodiments are disclosed, still other embodiments of the present disclosure will become apparent to those skilled in the art from the following detailed description, which shows and describes illustrative embodiments of the disclosure. Accordingly, the drawings and detailed description are to be regarded as illustrative in nature and not restrictive.

BRIEF DESCRIPTION OF THE DRAWINGS

The embodiments will be more readily understood in view of the following description when accompanied by the below figures and wherein like reference numerals represent like elements. These depicted embodiments are to be understood as illustrative of the disclosure and not as limiting in any way.

FIGS. 3A and 3B are graphs showing drive cycle torque limit on reduced traction surface as known in the art;

FIGS. 4A through 4D are graphs showing drive cycle torque limit on reduced traction surface according to embodiments disclosed herein;

FIGS. 5A through 5D are graphs showing drive cycle torque limit on reduced traction surface according to embodiments disclosed herein;

FIGS. 6A through 6D are graphs showing drive cycle torque limit on reduced traction surface according to embodiments disclosed herein;

FIG. 7 is a schematic flow diagram of a procedure for managing traction control events according to embodiments disclosed herein; and FIG. 8 is a schematic flow diagram of another procedure for managing traction control events according to embodiments disclosed herein.

Figure 1A:
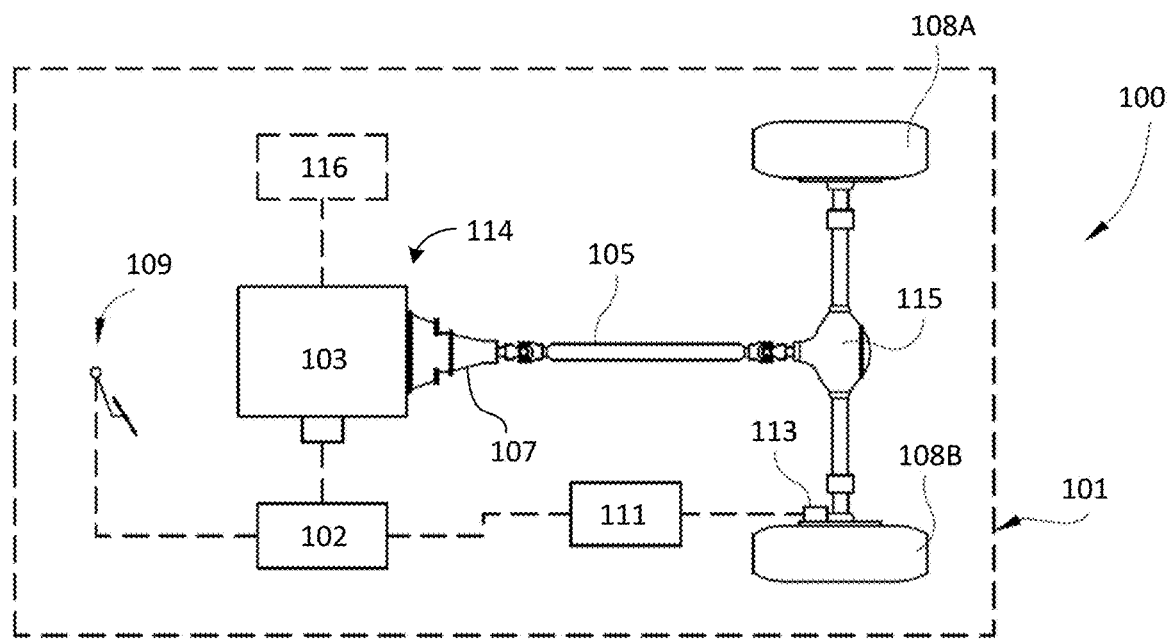
FIGS. 1A and 1B are schematic block diagrams of a vehicle with a traction control system according to embodiments disclosed herein.

While the present disclosure is amenable to various modifications and alternative forms, specific embodiments have been shown by way of example in the drawings and are described in detail below. The intention, however, is not to limit the present disclosure to the particular embodiments described. On the contrary, the present disclosure is intended to cover all modifications, equivalents, and alternatives falling within the scope of the present disclosure as defined by the appended claims.

DETAILED DESCRIPTION OF THE DISCLOSURE

In the following detailed description, reference is made to the accompanying drawings which form a part hereof, and in which is shown by way of illustration specific embodiments in which the present disclosure is practiced. These embodiments are described in sufficient detail to enable those skilled in the art to practice the present disclosure, and it is to be understood that other embodiments can be utilized and that structural changes can be made without departing from the scope of the present disclosure. Therefore, the following detailed description is not to be taken in a limiting sense, and the scope of the present disclosure is defined by the appended claims and their equivalents.

Reference throughout this specification to "one embodiment," "an embodiment," or similar language means that a particular feature, structure, or characteristic described in connection with the embodiment is included in at least one embodiment of the present disclosure. Appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the present disclosure, however, absent an express correlation to indicate otherwise, an implementation may be associated with one or more embodiments. Furthermore, the described features, structures, or characteristics of the subject matter described herein may be combined in any suitable manner in one or more embodiments.

Referencing FIG. 1A, a vehicle system 100 includes a vehicle 101. The system 100 further includes a powertrain or a drive unit 114 having a prime mover 103. The prime mover 103 may include an internal combustion engine and/or one or more electric devices selectively coupled to a drive shaft 105. The prime mover 103 may be any type of internal combustion engine and/or electric motor known in the art arranged to provide a hybrid powertrain, an electric powertrain, or an internal combustion engine powertrain. In the example of FIG. 1A, the prime mover 103 is coupled to the driveshaft 105 through a transmission 107. A differential 115 couples the driveshaft 105 with the wheels 108.

The system 100 further includes an optional electrical energy storage device 116 that can be connected to prime mover 103. Electrical energy storage device 116 is electrically connected to store electricity generated by the vehicle 101. The electrical energy storage device 116 can be a battery such as a lithium ion battery, a lead-acid battery, a nickel metal hydride battery, or any other device capable of storing electrical energy. In certain embodiments, energy may be stored non-electrically, for example in a high performance fly wheel, in a compressed air tank, and/or through deflection of a high capacity spring. Where the energy is stored electrically, any electrical energy storage device 116 is contemplated herein, including a hyper-capacitor and/or an ultra-capacitor.

In certain embodiments, the system 100 includes the drive shaft 105 mechanically coupling the prime mover 103 to two or more vehicle drive wheels 108A and 108B. The system 100 may include any other type of load other than or in addition to drive wheels 108, for example any load that includes stored kinetic energy that may intermittently be slowed by any braking device included in the power train or drive unit 114. An exemplary system 100 includes one or more mechanical braking devices responsive to a mechanical braking command.

An exemplary mechanical braking device includes a compression braking device (not shown), for example a device that adjusts the valve timing of a prime mover that includes an engine such that the engine becomes a torque absorber rather than a torque producer. Another exemplary mechanical braking device includes an exhaust throttle (or exhaust brake) that, in moving toward a closed position, partially blocks an exhaust stream and applies back pressure on the engine resulting in a negative crankshaft torque amount. Yet another exemplary mechanical braking device is a variable geometry turbocharger (VGT) device that can be adjusted to produce back pressure on the engine and provide a braking effect. Still another exemplary mechanical braking device includes a hydraulic retarder. The hydraulic retarder is typically incorporated with the transmission 107. The mechanical braking device may be any braking device which is not the conventional friction brakes of the vehicle 12, and the described examples are not exclusive.

The system 100 further includes a torque request device 109 that provides a torque request value. An exemplary deceleration request device comprises a throttle pedal position sensor. However, any device understood in the art to provide a torque request value, or a value that can be correlated to a present negative torque change request or positive torque change request for the powertrain or drive unit 114 is contemplated herein. As used herein, negative braking torque includes vehicle braking provided by or able to be provided by the powertrain 14 without friction braking.

System 100 also includes a traction control system 111 connected to one or more wheels 108. Traction control system 111 is configured to detect a traction control event associated with wheels 108. In certain embodiments, the traction control event is a loss of traction determined by, for example, an antilock brake system (ABS) 113 and indicative of a reduced traction surface. For example, the loss of traction can be detected by ABS 113 in response to one or more of wheels 108 slipping on a road surface. A traction control event signal is provided to controller 102 to derate the nominal torque applied by powertrain or drive unit 114 to wheels 108 to reduce slippage in response to the traction control event. Hereinafter, a traction control event is also referred to as an "ABS event" because the existence of such event causes the ABS 113 to respond.

As discussed further below, controller 102 is configured to incrementally change the derate torque applied by powertrain or drive unit 114 over a number of traction control events to gradually reduce the nominal torque. After a predetermined period of time expires with no traction control events, the incrementally reduced derate torque is released to gradually return to the nominal derate torque. In one embodiment, this allows fuel economy to be increased by more fully utilizing available regenerative braking torque capacity during traction control events. The incremental changes to the derate torque and the gradual return of the derate torque to the nominal derate torque are controlled by the controller 102 based on the measured ambient temperature and/or GPS information, for example, as explained below.

The controller 102 of system 100 may include modules structured to functionally execute operations for managing the torque derate of powertrain or drive unit 114. The controller 102 is linked to the torque request device 111 and the powertrain or drive unit 114. In certain embodiments, the controller 102 forms a portion of a processing subsystem including one or more computing devices having memory, processing, and communication hardware. The controller 102 may be a single device or a distributed device, and the functions of the controller 102 may be performed by hardware or instructions encoded on a computer readable medium.

Figure 1B:
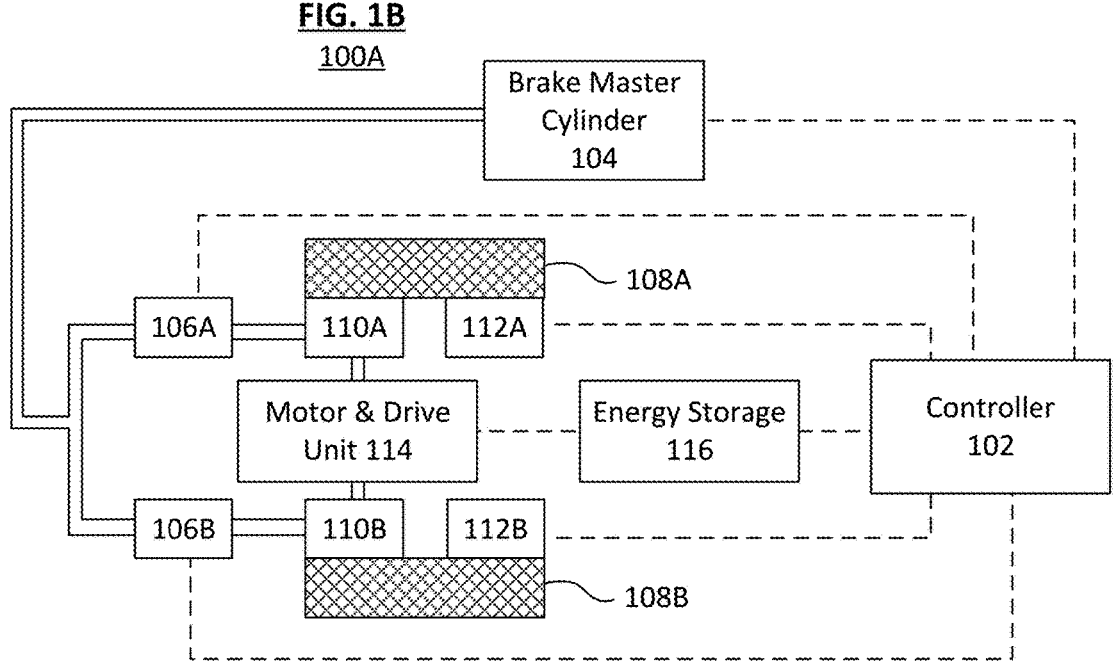

As shown in FIG. 1B, another example of a vehicle system 100A. The system 100A includes a controller 102, a brake master cylinder 104 controlled by the controller 102, a brake 110 with a brake-pressure modulation valve 106 controlling it, and a motor and drive unit 114 coupled to wheels 108. For simplicity, only two wheels 108A and 108B (e.g., front wheel or rear wheels) of a vehicle is shown, but it is understood that the ABS may include components configured to perform anti-lock capability on additional sets of wheels, as suitable. Each wheel 108 has a corresponding sensor 112A or 112B to take measurements including but not limited to speed of the vehicle. An energy storage device 116 is coupled with the motor in the motor and drive unit 114. It is to be understood that, although not shown, other components such as engine and transmission may be included if the vehicle is a hybrid vehicle, and an inverter may also be included in the system to convert the DC power to AC power to drive the motor, for example.

Each solid connection in FIG. 1B represents a mechanical coupling such as via mechanical parts or pipes, whereas each broken line represents an electrical coupling such as via wired or wireless connections. When the brakes 110 (e.g., brakes 110A and 110B coupled with the wheels 108A and 108B, respectively) are applied, fluid is forced from the brake master cylinder 104 through the pipes, where pressure is transmitted through solenoid valves or brake-pressure modulation valves 106, which are parts of a hydraulic control unit (HCU). The sensors 112 detect the operation of the wheels 108, and when the controller 102 detects conditions in the wheels 108 (as measured by the sensors 112) indicating that the wheels 108 are about to lock, the controller 102 closes the valves 106 (for example, valves 106A and 106B as coupled with brakes 110A and 110B) and prevents any more fluid from entering the circuit. The locking of the valves 106 remain until the controller 102 detects that the wheels 108 are no longer decelerating, as measured by the sensors 112.

The electric motor implemented in the motor and drive unit 114 can be used in braking as well in the form of regenerative braking. When the brake pedal is pressed, the motor is treated as a generator to produce negative torque, in which case the produced energy is dissipated or used to chare the energy storage device 116, such as batteries.

Figure 2:
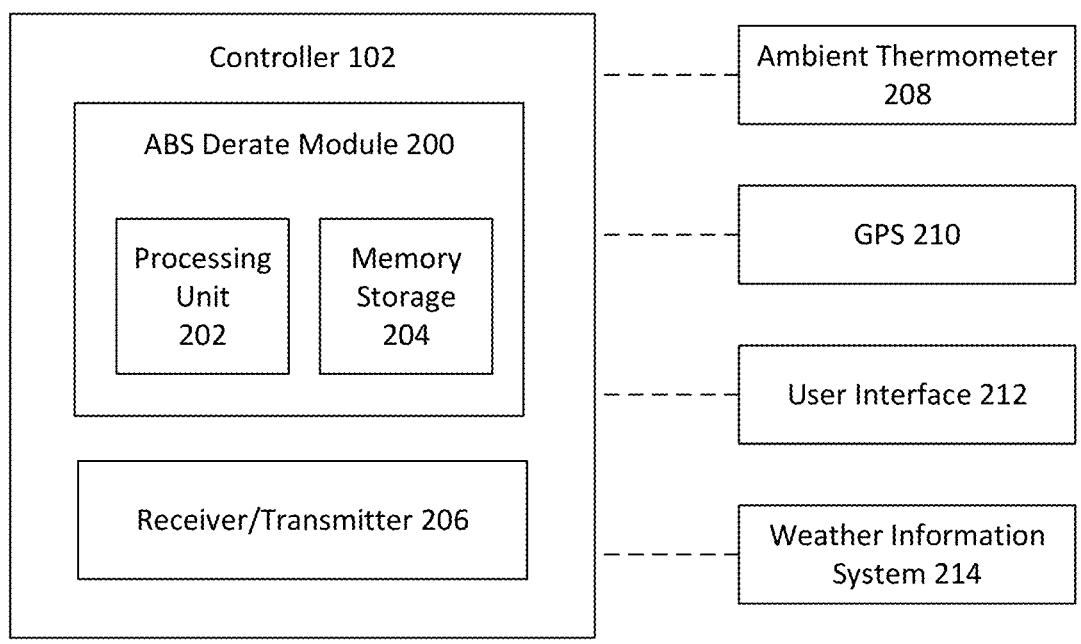
FIG. 2 is a schematic block diagram of a controller that functionally executes certain operations for managing traction control events as well as devices and systems to be used in conjunction with the controller, according to embodiments disclosed herein.

FIG. 2 illustrates the subcomponents of the controller 102 according to some examples. The controller 102 has an ABS derate module 200 and a receiver/transmitter 206 set. The ABS derate module 200 includes a processing unit 202 and a memory storage device 204. The processing unit 202 may be any suitable processor, e.g. a central processing unit (CPU), a system on a chip (SoC), or a multi-chip module (MCM), etc., as applicable, and the memory storage device 204 may be any suitable device to hold data regarding programs, instructions, algorithms, and other types of information, to be accessed and executed by the processing unit 202. The memory storage device 204 may be a random-access memory (RAM), read-only memory (ROM), flash memory, or any other types of suitable data storage devices.

The receiver/transmitter 206 is capable of receiving and transmitting data in the form of signals via wired and/or wireless communications. In some examples, the receiver/transmitter 206 allows the controller 102 to access a plurality of external components outside of the vehicle, such as ambient thermometer 208 to measure the ambient air temperature surrounding the vehicle, GPS 210 to detect location of the vehicle, and user interface 212 to receive input from the user, who may be the operator or driver of the vehicle. The controller 102 in some examples is also capable of receiving data from a weather information system 214 which may be an application software on a mobile device, or website accessible via the Internet. Alternatively, the weather information system 214 may include a radio channel that reports the weather information. The weather information may be provided visually, auditorily, or via encrypted data. The controller 102 may include a module which transcribes the visual or auditory information into a form of data that is usable by the ABS derate module 200 for further processing. In some examples, the wired connection may include a serial cable, a fiber optic cable, a CAT5 cable, or any other form of wired connection. The wireless connections may include the Internet, Wi-Fi, cellular, radio, Bluetooth, ZigBee, etc. In some examples, a controller area network (CAN) bus provides the exchange of signals, information, and/or data. The CAN bus includes any number of wired and wireless connections.

While the term "processor" is briefly defined above, the terms "processor" and "processing unit" are meant to be broadly interpreted. In this regard and as mentioned above, the "processor" may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example, the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server).

In some examples, the controller 102 operates such that, upon occurrence of a momentary braking torque derate event triggered by the onboard ABS device (e.g., the sensors 112 detecting measurements indicative of such event), the controller 102 establishes a permanent incremental derate such that when the ABS derate event ends, the maximum allowed braking torque is diminished from what was allowed before the traction control event, or the ABS event. The permanent derate may be stored in the memory storage device 204 and updated as more occurrences of the momentary braking torque derate event are detected by the controller 102. Upon each subsequent ABS derate event, the controller 102 incrementally tightens the permanent braking torque derate, permitting less and less allowed braking torque with each ABS event. Alternatively, when there is an extended period with no ABS derate events, the controller 102 may slowly release the permanent derate, eventually allowing full braking torque again.

Momentary braking torque derate events are known to occur more frequently on slick roads than on dry pavements. FIGS. 3A and 3B illustrate a baseline case of a drive cycle on reduced traction surface, with ABS events implemented according to a previously known ABS control method during a time window of 500 seconds. In FIG. 3A, the vehicle is traveling along a surface with variable torque measurements within the drive cycle. Regenerative braking torque regularly enters or "dips" into a torque range that could cause traction problems on slick road conditions. On dry roads, there are no traction problems and no ABS events, so there would be no total torque limit that is implemented, but when the road is a reduced traction surface, this torque range causes the vehicle to experience numerous ABS derate events (marked by the small spikes in the lower line of the graph, indicated as "ABS event").

Large braking torques cause traction losses and trigger ABS derate events. In response, the ABS reacts by dramatically increasing a total torque limit 300 (marked by the large spikes in the upper line of the graph in FIG. 3B) during these ABS events. These are merely "spikes" because, as soon as the ABS event ends, the increase in the total torque limit also ends, allowing the vehicle to travel in the same manner as before the ABS event. As shown in these graphs, the ABS repeats this process each time an ABS event is detected, thereby making each one a "momentary" braking torque derate event. As such, during a traction control event, the ABS commands a momentary derate to regain traction and then relinquishes control such that full braking torque range is once again available. No sustained torque limiting is enforced after immediate symptoms of the traction event are corrected.

The methods described herein reduce the likelihood of repeated traction control events on slick surfaces and require no change to existing conventional ABS devices and resides entirely within the regenerative braking controller. The techniques described in this disclosure could also be applied to other braking methods, such as engine compression braking or exhaust braking.

FIGS. 4A through 4D illustrate an example of incremental derating and incremental releasing of the derating for a drive cycle on reduced traction surface, according to embodiments disclosed herein. A total torque limit 400 (broken line) is shown to increase incrementally from 0 to approximately 200 seconds with each ABS event, after which there is a sustained verification period 402 where the controller observes if any additional ABS event takes place. If no ABS event occurs, no change is made to the total torque limit 400, i.e. no further derating or reduction in the derating. In some examples, a timer is used to measure the length of time after the previous ABS event, such that when a determined length of time (i.e. the verification period 402) passes without any ABS event, the torque limit is allowed to be reduced.

After the verification period 402 ends with no further ABS event, the torque limit is gradually reduced or "ramped down" to the former no-derate value, as shown in a derate reduction period 404. The reduction or ramping down of the torque limit 400 depends on numerous factors as further explained herein. The length of the ramp, or the rate at which the reduction takes place, also varies based on these factors, as determined by the controller. In this example, a verification period of 20 minutes with no ABS events permits gradual relaxation of derate over a derate reduction period of 25 minutes.

The methods disclosed are applicable to braking methods other than regenerative braking and therefore does not require an electric drive. Electric and hybrid drive vehicles, particularly with the low accelerator pedal braking, offer benefit in applying the methods disclosed herein because of the frequent and unavoidable braking application. Those of ordinary skills in the art would understand that the basic technique of these methods may be applied to compression braking torque limits as well. Alternatively, the methods disclosed herein are not limited to the braking torque applications, but may be applied such that positive traction torque may be derated in the same or similar manner, as suitable. In some examples, it may also be desirable to take no permanent action following the first one or two traction events, in order to prevent the controller from causing derates due to a small patch of loose gravel or sand on the road surface, for example. The methods may be applied to mitigate traction control problems in slick road conditions over a wider area, such as may be experienced in winter or rainy conditions, for example.

FIGS. 5A through 5D illustrate an example of incremental derating and incremental releasing of the derating for a drive cycle on reduced traction surface at a lower atmospheric temperature, according to embodiments disclosed herein. A total torque limit 500 (broken line) is shown to be imposed on the system at approximately 60 seconds, which is when the first and only ABS event is detected. Based on the factors as described herein, the controller determines to set the torque limit 500 at a predetermined derate level in a single, large increment that is larger than any single increment shown in the torque limit 400. Afterwards, there is a sustained verification period 502 where no change is made to the total torque limit 500, i.e. no further derating or reduction in the derating, as long as the ABS events stop occurring. The torque limit 500 is then allowed to relax the derate in a derate reduction period 504. In this example, the verification period of 30 minutes with no ABS events permits gradual relaxation of derate over a derate reduction period of 25 minutes.

The difference in the torque limits 400 and 500 results from the different ambient or environmental conditions. The torque limit 400 occurs in a relatively warm environment, where the ambient temperature is above a freezing point of water (0° C.), for example. When the ambient temperature is colder, such as close to, at, or below water's freezing point, the reduced traction surface is not only wet from the water located on the surface, but the water may be partially or entirely frozen to cause ice to cover at least a part of the surface, thereby further reducing the traction. In some cold driving conditions, even a single ABS event can cause vehicle yaw (side-to-side motion) that a driver may consider dangerous. In these cases, it may be desirable to have a driver-activated regenerative braking derate to prevent even the single slip event (ABS event). However, simply offering a dashboard switch to turn off or reduce regenerative braking may result in energy capture being disabled on a long-term basis, even with favorable road conditions.

Therefore, in the present method, upon the first detection of an ABS event at approximately 60 seconds, the controller in FIGS. 5A through 5D sets the torque limit 500 at a predetermined torque limit level with a single, large increment. Because of the cold temperature, the verification period 502 for the torque limit 500 is longer than the verification period 402 for the torque limit 400, which adds an additional layer of safety for the driver. Furthermore, although the derate reduction period 504 is shown as being the same the derate reduction period 404, in some examples, the derate reduction period 504 can be longer than the derate reduction period 404 when the temperature is colder, in response to the controller determining that a sudden derate may likely be performed based on factors such as weather and road conditions, for example.

In some examples, a driver-activated dashboard switch is used in conjunction with the present method by treating the switch activation as an ABS event. That is, on switch activation, the controller reduces the braking limit as though an ABS event had occurred. The reduction may be the same increment as would occur for a single, actual ABS event, or the reduction could be the maximum allowed reduction. Alternatively, the reduction may be an amount that varies with the ambient temperature. After switch activation, the controller measures a duration of time with neither another switch activation nor an ABS event. When the duration lasts longer than the determined verification period, the derate is relaxed back to a no-derate condition at a rate determined by the derate reduction period. Subsequent switch activations repeats this same effect. Through this means, a dashboard switch could be utilized that would not unnecessarily impair energy capture for an extended period of time. Such driver-activated dashboard switch may be implemented as part of the user interface 212 as shown in FIG. 2.

FIGS. 6A through 6D illustrate an example of incremental derating and incremental releasing of the derating for a drive cycle on reduced traction surface at a higher atmospheric temperature, according to embodiments disclosed herein. A total torque limit 600 (broken line) is shown to be imposed on the system until approximately 190 seconds. There are numerous ADS events occurring during this time, and at each event, the torque limit 600 increases incrementally as shown. Afterwards, there is a sustained verification period 602 where no change is made to the total torque limit 600, i.e. no further derating or reduction in the derating, as long as the ABS events stop occurring. The torque limit 600 is then allowed to relax the derate in a derate reduction period 604. In this example, the verification period of 5 minutes with no ABS events permits gradual relaxation of derate over a derate reduction period of 3 to 4 minutes.

The verification period 602 and the derate reduction period 604 of the torque limit 600 are both shorter than those determined in previous examples (torque limits 400 and 500) because the atmospheric temperature is higher than in the previous examples. In a warm ambient environment, the controller imposes a moderate, sustained derate on braking torque that increments up on each ABS event, until the ABS events quit occurring. In such environment, water on the road surface does not freeze into ice, and in some examples, when the weather condition is sunny and dry, the water may even evaporate or be absorbed into the earth, thereby increasing traction on the road surface. In this regard, the atmospheric and environmental information obtained may include the weather condition, which may include humidity and/or precipitation (or, alternatively, lack thereof), for example, in addition to temperature.

Referring further to FIG. 7, an algorithm, process, method, or procedure 700 as performed or implemented by a controller. The procedure 700 includes step 702 to obtain ambient information and/or GPS information. In step 704, the controller detects a traction control event. Procedure 700 continues at conditional step 706 to determine with a previous traction control event occurred in a predetermined time threshold. If conditional step 706 is positive, procedure 700 continues at step 708 to incrementally derate the torque that is applied to the powertrain or drive unit in response to the traction control event. Procedure 700 continues from step 708 at step 704 to detect a subsequent traction control event. In some examples, the procedure 700 continues from step 708 to step 702 to update the ambient and/or GPS information, as suitable.

If conditional step 706 is negative, procedure 700 continues at conditional step 710 to determine if a torque derate increment from the nominal or maximum derate torque is active. If conditional step 710 is negative procedure 700 returns to step 702 or 704. If conditional step 710 is positive, procedure 700 continues at step 712 to incrementally release the torque derate from the incremented torque derate toward the maximum or nominal torque derate so that the torque derate gradually returns toward the maximum or nominal torque derate. Procedure 700 returns from step 712 to step 702 or 704, as suitable.

Procedure 700 includes detecting a plurality of traction control events for a vehicle in which the vehicle loses traction with a road surface at each traction control event. Procedure 700 further includes, in response to detecting each of the plurality of traction control events, incrementally derating a torque applied to a powertrain of the vehicle for each subsequent traction control event relative to a previous traction control event. In certain embodiments of procedure 700, detecting the traction control event includes interpreting a signal from a traction control system of the vehicle indicative of a loss of traction. In further embodiments, the traction control system is an anti-lock brake system of the vehicle.

In other embodiments of procedure 700, derating the torque further includes one of derating a negative braking torque and derating a positive drive torque. Derating the torque may further include limiting or reducing incrementally the negative braking torque applied by regenerative braking. Derating the torque may also include limiting or reducing incrementally the negative braking torque applied by compression release braking. Derating the torque may also include limiting or reducing incrementally the negative braking torque applied by exhaust braking.

In other embodiments, procedure 700 includes incrementally derating the torque for a plurality of traction control events detected over a predetermined period of time, where the increment of the derating is based on the ambient and/or GPS information. After an expiration of a period of time since a last traction control event, procedure 700 includes incrementally releasing or increasing the derating of torque toward a maximum allowable torque to be applied to the powertrain in response to the traction control event, where the increment of the releasing or increasing of the derating is based on the ambient and/or GPS information. In other embodiment, procedure 700 includes incrementally derating the torque only after two or more traction control events are detected, where the increment of the derating is based on the ambient and/or GPS information.

Referring further to FIG. 8, an algorithm, process, method, or procedure 800 as performed or implemented by a controller. The procedure 800 includes step 802 to obtain ambient information and/or GPS information. The procedure 800 also includes step 804 to determine (a) an increment size, (b) a verification period, and (c) a derate reduction period based on the obtained ambient and/or GPS information. Thereafter, at conditional step 806, the controller determines if a traction control event is detected. If no such event is detected, in step 810, the vehicle is allowed to operate without derating, after which the procedure 800 returns to step 802. If a traction control event is detected in step 806, the procedure 800 proceeds to step 808 to impose a sustained derate on the braking torque using the determined increment size from step 804. The increment size may be smaller for a warmer atmospheric temperature and larger for a colder atmospheric temperature, for example.

The controller then detects subsequent traction control event, if any, in step 812. For each detected traction control event, in step 814, the derate is incrementally increased on each traction control event using the increment size determined in step 804. The steps 812 and 814 are repeated until there is no detected traction control event. In conditional step 816, the controller determines if the verification period (determined in step 804) has passed without any traction control event. If any traction control event takes place during this period, the timer is reset and the procedure 800 returns to step 812. Otherwise, if no traction control event occurs during the verification period, the torque limit is gradually decreased in step 818 based on the derate reduction period determined in step 804. The derate reduction period may be longer for a colder atmospheric temperature and shorter for a warmer atmospheric temperature, for example.

The procedure 800 may be repeated from step 802 or step 806, as suitable. If new ambient information is detected or the new GPS information indicates that the vehicle has traveled to a new region that has different atmospheric conditions from before, the controller may decide to update the ambient information and/or GPS information to determine new values for the verification period, increment size, and derate reduction period.

As previously mentioned, the environmental conditions include but are not limited to atmospheric temperature and weather/environmental conditions. Different environmental conditions may dictate vastly different choices for both derate magnitude and duration. As illustrative examples, a transit bus in Aspen in January may encounter icy, snowy, or slippery roads that persist for hours, and for which multiple slip events could have severe consequences. On the other hand, a transit bus in Tucson in August may encounter an extremely wet road, possibly resulting in large puddles, or some sand or gravel debris that is highly localized. As such, these encounters are unlikely to last more than a minute and do not pose as severe a danger as slipping on glare ice. Utilizing the same reaction to both scenarios either underperforms in Aspen or overreacts in Tucson.

Therefore, the presently disclosure describes different operating scenarios that may be driven by seasonal weather conditions (or other variables, as further disclosed herein). In winter conditions, the traction control events are more severe because of both the likelihood of slippage and the resulting extreme friction reduction due to ice or snow on the surface. In comparison, summer or warmer weather conditions are unlikely to have as severe a reduction in road friction as ice or snow, nor are likely to exist over as wide a geographical area. Utilizing an ambient air temperature sensor, for example, will give the controller critical information to help differentiate these different conditions. In cold ambient temperatures, the magnitude of the post-ABS-event (or post-traction control event) derate increment can be increased, and the sustained duration of this derate can be extended. In warm ambient temperatures, the magnitude of the derate increment can be smaller such that a vehicle could tolerate multiple ABS events if necessary to produce a severe derate, and the derate can be phased out sooner.

Additionally, in some examples, altitude may also affect the verification period, increment size, and a derate reduction period because the freezing point of water increase as altitude increases and the atmospheric pressure decreases correspondingly. Although the change in freezing point may be slight, the inclusion of such environmental information in some examples increases the accuracy of the procedures as implemented.

As is evident from the figures and text presented above, a variety of embodiments according to the present invention are contemplated. In some examples, detecting the traction control event includes interpreting a signal from a traction control system of the vehicle indicative of a loss of traction. In some examples, the traction control system is an anti-lock brake system of the vehicle. In some examples, derating the torque further includes one of derating a negative braking torque and derating a positive drive torque. In some examples, derating the torque further includes limiting the negative braking torque applied by regenerative braking. In further examples, derating the torque further includes limiting the negative braking torque applied by compression release braking. In yet other examples, derating the torque further includes limiting the negative braking torque applied by exhaust braking.

In some examples, the controller is configured to incrementally derate a negative braking torque applied by a regenerative braking system. In some examples, the controller is configured to incrementally derate a negative braking torque applied by at least one of a compression release braking system and an exhaust brake. In yet other examples, the controller is configured to incrementally derate a positive torque applied by at least one of a motor and an internal combustion engine of the drivetrain.

In some examples, a system is provided that includes a powertrain and a controller. The powertrain includes at least one of an internal combustion engine and an electrical device, and the powertrain is connected to a plurality of wheels and a traction control system. The controller is in communication with the traction control system and at least one of the engine and the electrical device. The controller is configured to receive a traction control event signal from the traction control system indicating a loss of traction of the wheels, and the controller is further configured to incrementally derate a torque applied to the powertrain relative to a torque derate for a previous traction control event in response to the traction control event signal.

In one embodiment, the electrical device is operably coupled to an electrical energy storage device. In another embodiment, the torque derate is a negative torque. In a further embodiment, the torque derate is a positive torque.

The present subject matter may be embodied in other specific forms without departing from the scope of the present disclosure. The described embodiments are to be considered in all respects only as illustrative and not restrictive. Those skilled in the art will recognize that other implementations consistent with the disclosed embodiments are possible. The above detailed description and the examples described therein have been presented for the purposes of illustration and description only and not for limitation. For example, the operations described can be done in any suitable manner. The methods can be performed in any suitable order while still providing the described operation and results. It is therefore contemplated that the present embodiments cover any and all modifications, variations, or equivalents that fall within the scope of the basic underlying principles disclosed above and claimed herein. Furthermore, while the above description describes hardware in the form of a processor executing code, hardware in the form of a state machine, or dedicated logic capable of producing the same effect, other structures are also contemplated.

What is claimed is:

1. A method of operating a vehicle on a reduced traction surface, comprising:
    obtaining, by a controller of the vehicle, at least one of: ambient information or GPS information;
    determining, by the controller, an increment size by which a torque limit, associated with a maximum allowed braking torque for the vehicle, is configured to be changed, the increments size being based on the ambient information or the GPS information; and
    the response to detecting a traction control event indicative of a loss of traction by the vehicle, imposing, by the controller, a sustained derate by applying for a sustained duration of time the torque limit on the maximum allowed braking torque of the vehicle based on the increment size.

2. The method of claim 1, further comprising:
    in response to detecting subsequent traction control event, incrementally increasing, by the controller, the torque limit on the maximum allowed braking torque based on the increment size.

3. The method of claim 1, further comprising:
    determining, by the controller, a verification period based on the ambient information or the GPS information; and
    in response to detecting a lack of traction control event during the verification period, determining to remove the torque limit.

4. The method of claim 3, further comprising:
    determining, by the controller, a derate reduction period based on the ambient information or the GPS information; and
    in response to determining to removing the torque limit, reducing the sustained derate by changing the torque limit at a rate determined by the derate reduction period.

5. The method of claim 4, wherein the increment size, the verification period, and the derate reduction period are greater when the ambient information or the GPS information indicates a lower atmospheric temperature.

6. The method of claim 5, wherein the lower atmospheric temperature is at or below 0° C.

7. The method of claim 1, wherein the ambient information includes one or more of: atmospheric temperature, atmospheric pressure, weather condition, humidity, or precipitation.

8. The method of claim 1, wherein detecting the traction control event includes interpreting a signal from a traction control system of the vehicle indicative of the loss of traction.

9. The method of claim 8, wherein the traction control system is an anti-lock brake system of the vehicle.

10. The method of claim 1, wherein imposing the sustained derate further includes one of: applying limit on a negative braking torque or applying limit on a positive drive torque.

11. An apparatus for operating a vehicle on a reduced traction surface comprising: a controller configured to:
    obtain at least one of: ambient information or GPS information;
    determine, based on the ambient information or the GPS information, an increment size by which a torque limit, associated with a maximum allowed braking torque for the vehicle, is configured to be changed; and in response to detecting a traction control event indicative of a loss of traction by the vehicle, impose a sustained derate by applying for a sustained duration of time the torque limit on the maximum braking torque of the vehicle based on the increment size.

12. The apparatus of claim 11, wherein the controller is further configured to incrementally increase the torque limit on the maximum allowed braking torque based on the increment size in response to detecting subsequent traction control event.

13. The apparatus of claim 11, wherein the controller is further configured to:
   determine, based on the ambient information or the GPS information, a verification period; and
   determine to remove the torque limit in response to detecting a lack of traction control event during the verification period.

14. The apparatus of claim 13, wherein the controller is further configured to:
   determine, based on the ambient information or the GPS information, a derate reduction period; and
   reduce the sustained derateby changing the torque limit based on the derate reduction period in response to detecting a lack of traction control event during the derate reduction period.

15. The apparatus of claim 14, wherein the increment size, the verification period, and the derate reduction period are greater when the ambient information or the GPS information indicates a lower atmospheric temperature.

16. The apparatus of claim 15, wherein the lower atmospheric temperature is at or below 0° C.

17. The apparatus of claim 11, wherein the ambient information includes one or more of: atmospheric temperature, atmospheric pressure, weather condition, humidity, or precipitation.

18. The apparatus of claim 11, wherein the controller detects the traction control event by interpreting a signal from a traction control system of the vehicle indicative of the loss of traction.

19. The apparatus of claim 11, wherein the controller imposes the sustained derate by applying limit on a negative braking torque or applying limit on a positive drive torque.

20. A vehicle system comprising:
   a drive unit including a prime mover; and
   a controller coupled with the drive unit, the controller configured to:
      obtain at least one of: ambient information or GPS information;
      determine, based on the ambient information or the GPS information, increment size by which a torque limit, associated with a maximum allowing braking torque for the vehicle, is configured to be changed, a verification period, and a derate reduction period;
      in response to detecting a traction control event indicating a reduced traction surface, impose a sustained derate to the drive unit by applying for a sustained duration of the time the torque limit on the maximum allowed braking torque of the drive unit based on the increment size;
      determine to remove the torque limit in response to detecting a lack of traction control event during the verification period; and
      reduce the sustained derate based on the derate reduction period in response to detecting a lack of traction control event during the derate reduction period.

* * * * *